United States Patent [19]

Lee

[11] 4,106,965
[45] Aug. 15, 1978

[54] TIRE TREAD LINE STRIPPING

[75] Inventor: Michael Wayne Lee, Arlington, Ky.

[73] Assignee: The Goodyear Tire & Rubber Company, Akron, Ohio

[21] Appl. No.: 832,509

[22] Filed: Sep. 12, 1977

[51] Int. Cl.² .................. B29H 17/02; B29H 17/36
[52] U.S. Cl. ............................ 156/123 R; 118/44;
  118/207; 156/64; 156/128 R; 264/134;
  401/193; 425/173
[58] Field of Search ............. 156/405, 128, 96, 129,
  156/64, 378, 379; 73/156; 116/114 R; 425/173;
  264/40.1, 40.5, 129, 132, 134; 118/44, 76, 77,
  200, 207, 209, 239, 244, 246, 252; 401/193, 208,
  220

[56] References Cited
U.S. PATENT DOCUMENTS

| 1,762,752 | 6/1930 | Abbott | 156/405 |
|---|---|---|---|
| 2,041,022 | 5/1936 | Rassmussen | 401/193 |
| 2,130,356 | 9/1938 | Marshall | 118/207 |
| 3,026,230 | 3/1962 | Nebout | 156/405 |
| 3,534,681 | 10/1970 | Beals | 118/44 |
| 3,698,971 | 10/1972 | Matthews | 156/64 |

Primary Examiner—Douglas J. Drummond
Assistant Examiner—John E. Kittle
Attorney, Agent, or Firm—R. S. Washburn

[57] ABSTRACT

A method and apparatus for producing a tire such that the tire has a visible contrasting reference line consisting of a die line ridge produced coincidentally with the extrusion of the tread of the tire and a color contrasting ink applied to the peak surface of the die line ridge by a particularly described inking apparatus. The reference line so produced enables objective visual comparison of the position of the reference line relative to the position of the parting line visible in the cured tire as removed from the mold such that deviations of the reference line with respect to the parting line clearly indicate a tire having an objectionable dissymmetry with respect to its equatorial plane and such that the tire can be removed from the production stream. The reference line so produced and particularly the die line ridge have advantages over previously employed centerline tracking methods and apparatus. The foregoing abstract is not to be taken as limiting the invention of this application, and in order to understand the full nature and extent of the technical disclosure of this application, reference must be made to the accompanying drawing and the following detailed description.

9 Claims, 3 Drawing Figures

TIRE TREAD LINE STRIPPING

The present invention relates to manufacturing tires and particularly to a method and apparatus for making a tire so as to enable objective visual determination after curing the tire of the accuracy of the building process and the molding and curing process.

It is well known that inaccuracies in the manufacturing processes can adversely affect the performance of a tire in use. In particular, inaccuracies in the manufacturing process which result in dissymmetries with respect to an equatorial plane of the tire normal to its rotational axis produce undesirable effects in the performance of the tire. Massive efforts have been expended to segregate tires having such inaccuracies in order to prevent their being placed in use. Correspondingly great efforts have been expended in improving the manufacturing processes to minimize the occurrence of the inaccuracies likely to give rise to unsatisfactory performance of the tires manufactured. In the building process, equipment and methods are continually being sought to improve the accuracy and symmetrical relation of each component as the tire is being built. When completed, the uncured tire is then inserted into a tire curing mold. Improvements in equipment and in methods directed to insuring that the tire will be molded and cured in ideal rotational and axial symmetry are likewise sought.

Despite continuing improvement in the accuracy of manufacturing processes, some tires have undesirable inaccuracies after being removed from the final molding and curing operations. Occasionally a tire removed from a mold is found to have such conspicuous dissymmetry that it can be immediately scrapped; however, to segregate tires which may be defective for reasons of dissymmetry not clearly apparent, the tires produced have to be inspected by highly sophisticated and thus expensive equipment and methods.

An object therefore of the present invention is to provide dependable objective visual determination of the accuracy of the manufacturing process thereby enabling the segregation of tires known or strongly suspected of having inaccuracies, thereby improving the utilization of the more sophisticated and costly inspection equipment and methods.

Further objects and advantages of the invention will become apparent or be particularly pointed out herein.

The objects and advantages of the invention are carried out by the method of making a tire to enable objective visual determination, after curing the tire, of the accuracy of building and molding such tire which method comprises, while extruding uncured tread for such tire, providing thereon a visible, raised and inked reference line coincident with the longitudinal centerline of said tread; while building such tire, applying a length of said tread thereon and locating said line at the mid-circumferential plane of the tire; inserting the tire including the tread thereon into a mold having mold parts which meet at a parting line in said plane and curing the tire, said parting line causing a line marking around the tire after curing; then removing the tire; whereby the relation of said parting line marking and the visible reference line provide objective indication of the accuracy of building and of molding the tire.

The objects and advantages of the invention are carried out by an apparatus for making a visible reference line on a continuously extruded body of rubbery material comprising in combination; extruding means having a die defining the cross-section contour of said body; ridge forming means cooperating with said die to form a die line ridge extending along and integral with said body; carrying means carrying said body from the extruding means; and color means for applying contrasting colored ink to the peak surface only of said die line ridge and not to the remainder of the surface of said body; said color means comprising: an applicator wheel having color carrying means extending about the periphery of the wheel and transversely about ten times the width of said die line ridge, drive means for rotating said wheel in close proximity to said peak surface and at a surface speed differing slightly from the surface speed of said body, reservoir means for supplying ink to said color carrying surface means including metering means regulating the delivery of ink to said color carrying means to that quantity of ink removed therefrom by said peak surface of the ridge.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
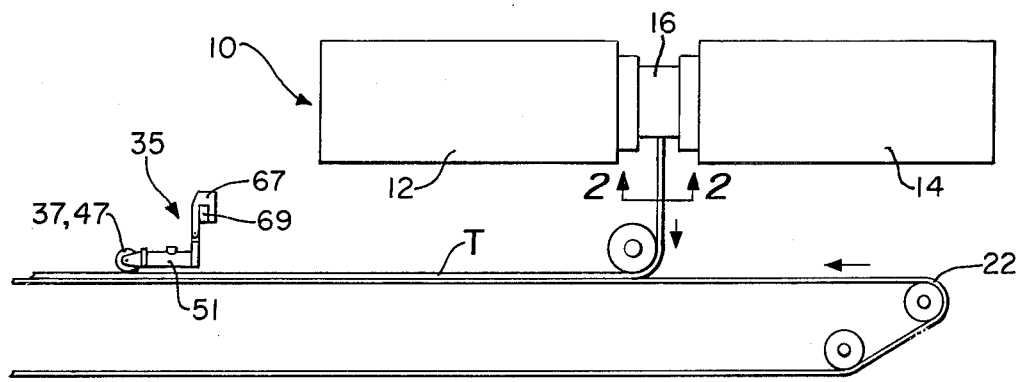
FIG. 1 illustrates schematically a preferred embodiment of the invention.
Figure 2:
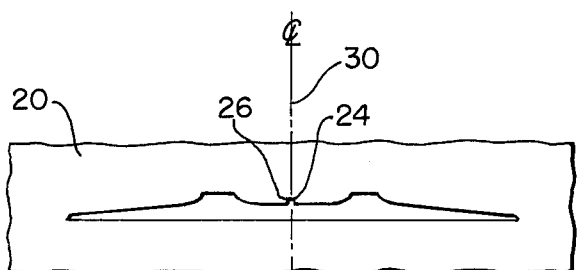
FIG. 2 illustrates a feature of the invention, a tire tread profile die and, as well, the profile or contour of the cross-section of a tire tread, the view being taken as indicated by the line 2—2 in FIG. 1.

Turning now to the drawings and particularly to FIG. 1, apparatus embodying the invention is shown in connection with extruding apparatus 10 for extruding a tire tread T. Two extruders 12, 14 feed their respective streams of tire tread compound to a die head 16 where the respective streams are joined and emerge through a tread profile die 20, illustrated in FIG. 2. Emerging from the die, the tread moves downward and is received and carried on a conveyor 22 of any suitable type, which is denominated herein as carrying means, by which the extruded tread is conveyed longitudinally and preferably horizontally from the extruding apparatus.

An important feature of the present embodiment is a ridge-forming means cooperating wih the die in order to form a die line ridge 24 extending along and integral with the body. The ridge-forming means is conveniently provided by a small notch 26 in the tread profile die 20 itself. The notch is located precisely at the longitudinal centerline 30 of the tread extrusion. The notch is approximately 0.05 inch (1.3 mm) in width and about the same dimension in height measured upward from the normal tread contour. Because of the notch, the tread profile issuing from the die carries an integral longitudinally extending ridge 24 protruding outward from the normal contour and located at the longitudinal centerline 30 of the tread which centerline is desired to coincide exactly with the equatorial plane of the tire carcass and of the ultimate tire.

The cross-sectional dimensions of the notch 26 and of the ridge 24 formed on the extruded tread by the notch are determined empirically. The ridge must be large enough so that its peak surface 24a can have a contrasting color applied only thereto and not to the adjacent surfaces of the ridge or of the tread. On the other hand, the dimensions of the ridge must be small enough so that in the molding process the ridge can be satisfactorily merged into the remaining body of the tread without affecting its desired final contour in the cured tire. The dimensions given have proved to be a satisfactory compromise.

Figure 3:
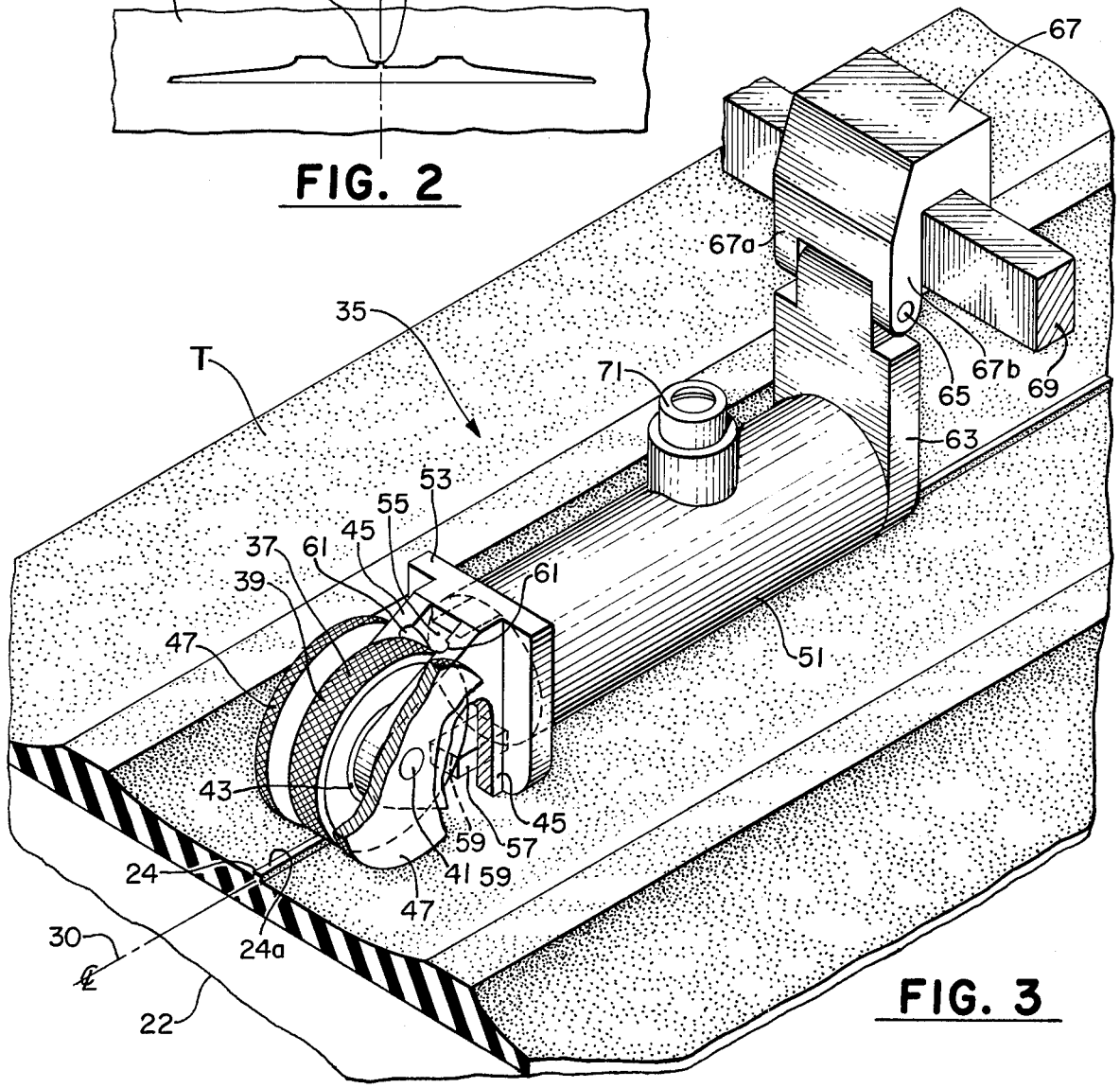
FIG. 3 is a perspective view enlarged of the color means portion of FIG. 1.

To provide visibility, a color contrasting ink is applied to the peak surface 24a of the die line ridge 24 by color means such as the inking apparatus 35 shown schematically in FIG. 1. In FIG. 3 the inking apparatus is shown enlarged for greater detail. The inking apparatus 35 comprises an applicator wheel 37 having a rim surface 39, providing color carrying means, extending about the periphery of the wheel and transversely of the wheel about ten times the width of the die line ridge 24. In the present embodiment, the rim surface 39 is lightly knurled around and across the periphery of the wheel, enabling the surface to carry an ink film of useful thickness. The surface can be otherwise prepared, e.g., by etching or the like, to carry color contrasting ink satisfactorily. The applicator wheel is mounted corotatably on a shaft 41 which in turn is supported in bearings 43 carried in a pair of side plates 45. The surfaces of the respective side plates are disposed closely adjacent to the respectively associated plane sides of the applicator wheel 37 so as to inhibit the flow of ink between the sides of the wheel and the plates.

Drive means for rotating the wheel are provided by a pair of driving wheels 47 corotatably fitted on the respectively opposite ends of the shaft outward of the side plates.

The peripheries of the driving wheels are knurled lightly to engage the extruded tread T moving beneath the wheels in a non-slip rolling contact. The diameter of each driving wheel is slightly greater than the diameter of the applicator wheel. In the present embodiment the applicator wheel is 3.0 inches (about 75 mm) in diameter by ½ inch (about 12 to 13 mm) in width and the driving wheels are 3.075 inches (about 77 mm) in diameter by about ¼ inch (6 to 7 mm) in width. The diameter difference is such that the inking apparatus is carried (partially) by the driving wheels rolling on the extruded tread such that the rim surface 39 is close to but not in actual contact with the peak surface 24a of the die line ridge. This arrangement has a further advantage in that the surface speed of the rim surface 39 differs slightly, in particular slightly exceeds, the linear speed of the extruded tread with the die line ridge thereon. The application of the contrasting color ink to the peak surface of the die line ridge thus is not printing but is rather a wiping action sufficient to deposit a film of color contrasting ink on the peak of the ridge which film can survive the subsequent handling of the tread, of the uncured tire, and remain readily visible on the surface of the tire after the same has been molded and cured in the mold.

To supply ink to the color carrying means the apparatus provides a tank 51 having a head 53 secured integrally to the tank. The tank is conveniently formed of 3-inch pipe or the equivalent, and is about 8 inches in length. The previously mentioned side plates 45 are attached integrally to the head and define the sides of a rectangular opening 55 through the head so that the wheel 37 protrudes into the tank.

To regulate the quantity of ink delivered from the tank to the color carrying means of the applicator wheel, metering means in the form of a sharp-edged block 57 extends from one to the other of the side plates to position its sharp edge 59 closely adjacent the rim surface 39. The space between the surface 39 and the sharp edge 59 of the metering means is determined to suit the flow properties of the particular ink used. In the present embodiment, a white ink compatible with the tire tread compounds, is supplied by James H Matthews and Company, Pittsburgh, Penn. As the wheel 37 rotates, sufficient ink travels through the space, about 0.005 inches (1.25 mm), between the metering edge 59 and the wheel periphery to maintain a film of color contrasting ink continuously on the color carrying means of the wheel. As a result, only the ink which is transferred from the color carrying surface to the peak surface of the die line ridge is replaced and all of the ink which is not transferred to the die line ridge continues on the surface of the applicator wheel over the top and again through the fluid in the tank.

To accommodate ink which may accumulate on the edges of the wheel, relief grooves such as shown at 61 (FIG. 3) are provided in the respective sidewalls 45 where the color carrying means rotates downwardly toward the opening 55 in the head. The shapes of these grooves are best described by reference to the drawing. It will be noted, however, that the edges of the respective grooves incline at about 5° to 10° with respect to a tangent to the rim surface 19 as it enters the area of the relief grooves.

As has been mentioned, a portion of the weight of the inking apparatus is carried by the driving wheels 47. In order to support the apparatus in operating relation with respect to the conveyor 22 and the tread T thereon, the apparatus 35 is provided with an end plate 63, which also serves to close the tank against ink leakage. The plate upward of the tank 51 accomodates a pivot pin 65 which extends parallel to the application wheel shaft 41. A U-hanger 67 adapted for mounting on a horizontal beam 69 extending across the conveyor 22 at a suitable elevation has a pair of lugs 67a, 67b each of which is bored to receive the pivot pin 65. The mounting means thus described supports the inking apparatus 35 and is able to accommodate differing thicknesses of tread. The arrangement also permits the inking apparatus to be swung upward out of the way when required.

To refill the tank a filling port 71 is provided by a short upstanding collar welded or similarly secured to the sidewall of the tank and is tapped to accommodate a screw-threaded closure.

It is particularly noteworthy that the die line ridge 24 alone without the ink, or a contrasting ink line alone without the die line ridge cannot satisfactorily provide the permanent visual reference line or its useful function as described. A centerline groove sunk below the normal surface of the tread contour with or without color contrasting ink is unsatisfactory for the reason that a groove tends to close during the molding process and to become invisible as a result. Moreover, such a groove is a potential defect in the tread of the tire. If the groove contained ink as a distinctive marking, the closure of the groove tends to bury the inked line and thus defeat the purpose of the centerline marking. Likewise, the use of an ink line alone without the die line ridge cannot insure that the line in fact corresponds to the desired centerline of the tread formed by the notch 26 of the profile die. It is also to be noted that the color means, the inking apparatus 35 of the present embodiment, remains fixed relative to the width of the tread being extruded and the width of the conveyor.

While not at all apparent from pictures, drawings, or even observation, tire treads and other extruded bodies of rubbery materials tend to deviate from an ideal straight line path as they travel longitudinally along the conveyor. One of the particular advantages of the present method is that deviations laterally of the conveyor have no effect on the position of the desired particular visible reference line resulting from the combination of the die line ridge 24 and the contrasting colored ink applied to the peak surface of that ridge. In this way, compensation for deviations laterally are completely automatic as the die line ridge moves in one or the other direction relative to the width of the color carrying means.

The inking apparatus described has also a particular advantage in that no adjustment and no disassembly is either required by or available to the operators, whose sole responsibility is to refill the supply of ink.

In operation, the use of the methods and apparatus employing the described visual reference line will have become apparent to persons skilled in the art. A tire carcass is built by any of the usual methods, and a length of tread T having the described reference line is applied to the carcass, taking care to insure that the reference line is appropriately centered with respect to the equatorial plane of the carcass and the resulting tire. The completed uncured tire is then transferred to and inserted into a tire curing mold. The mold (not shown) is of the conventional, well-known, two-piece construction wherein the two mold half-pieces meet at a parting line which is coplanar with the desired equatorial plane of the tire normal to its rotation axis.

The parting line of the mold, as is known, produces on the tire after its cure in the mold, at least a visible line and often a thin flash of rubber compound squeezed outwardly between the two halves of the mold.

While the die line ridge formed on the extruded tread will be compressed radially inwardly and become merged with the normal desired contour of the tread, the color contrasting ink deposited by the color carrying means persists. Because of the ridge, the ink line is prevented from being occluded by the tread during the molding process and remains clearly and distinctly visible on the surface of the tire when removed from the mold. A completely objective assessment of the accuracy of the tire can then be made visually by observing any departure of the color contrasting inked reference line from the parting line resulting from the molding process itself. Such departure from coincidence of the reference line and the parting line is clear evidence that the manufacturing processes of building a tire or of molding and curing a tire have resulted in an undesirable dissymmetry and permits segregating the tire from the remaining tires produced.

While certain representative embodiments and details have been shown for the purpose of illustrating the invention, it will be apparent to those skilled in the art that various changes and modifications may be made therein without departing from the spirit or scope of the invention.

What is claimed is:

1. The method of making a tire to enable objective visual determination, after curing the tire, of the accuracy of building and molding such tire which method comprises:

while extruding uncured tread for such tire, providing thereon a visible raised and inked reference line coincident with the longitudinal centerline of said tread;

while building such tire, applying a length of said tread thereon and locating said line at the mid-circumferential plane of the tire;

inserting the tire including the tread thereon into a mold having mold parts which meet at a parting line in said plane and curing the tire, said parting line causing a line marking around the tire after curing;

then removing the tire;

whereby the relation of said parting line marking and the visible reference line provide objective indication of the accuracy of building and of molding the tire.

2. A method as claimed in claim 1, said reference line on said uncured tread comprising a die line ridge protruding outwardly from the remainder of the tread profile and a contrasting colored ink covering only the peak surface of the ridge;

and in said tire after curing comprising a line of color contrasting from the remainder of the cured tread, said ridge then being merged into the remainder of the tread.

3. A method as claimed in claim 1, and providing said visible reference line in the form of a narrow integral die line ridge protruding outward from the profile of the tread and applying to the peak surface of said ridge a contrasting colored ink.

4. A method as claimed in claim 3, further comprising applying said ink by color means including an applicator wheel having color carrying means on the peripheral surface thereof, means rotating said wheel at a peripheral surface speed slightly different from the surface speed of said ridge as the tread is extruded, and reservoir means for supplying ink to said color carrying means.

5. A method as claimed in claim 4, wherein said color carrying means is wider than said ridge by an amount sufficient to accommodate lateral deviations of said ridge relative to said wheel, and wherein said reservoir means includes means regulating the supply of ink to said color carrying means to that quantity of ink removed therefrom by said peak surface of the ridge.

6. An apparatus for making a visible reference line on a continuously extruded body of rubbery material comprising in combination;

extruding means having a die defining the cross-section contour of said body;

ridge forming means cooperating with said die to form a die line ridge extending along and integral with said body;

carrying means carrying said body from the extruding means; and color means for applying contrasting colored ink to the peak surface only of said die line ridge and not to the remainder of the surface of said body;

said color means comprising:

an applicator wheel having color carrying means extending about the periphery of the wheel and transversely about ten times the width of said die line ridge, drive means for rotating said wheel in close proximity to said peak surface and at a surface speed differing slightly from the surface speed of said body, reservoir means for supplying ink to said color carrying surface means including metering means regulating the delivery of ink to said color carrying means to that quantity of ink removed therefrom by said peak surface of the ridge.

7. Apparatus as claimed in claim 6, further including means for mounting said color means in ink-applying relation to said body where the body is carried on the carrying means.

8. Apparatus as claimed in claim 7, said reservoir means comprising a tank for holding a supply of ink, a spaced apart pair of side plates fixed on the tank, one at each side of said applicator wheel in close ink flow inhibiting relation to said wheel, a shaft rotatably mounted in said plates and corotatable with said applicator wheel, a pair of driving wheels corotatably mounted on the shaft respectively adjacent to and outward of each side plate said drive wheels being from 2 to 3 percent larger in diameter than said applicator wheel, a rectangular opening in said tank accommodating said applicator wheel, said opening having sides in close ink flow inhibiting relation with the applicator wheel and metering means spaced a predetermined regulating distance from the color carrying surface means of the applicator wheel.

9. An apparatus for applying a color contrasting ink line longitudinally along an extruded body of uncured rubbery material comprising means for forming a die line ridge extending longitudinally of said body, carrying means for moving said body longitudinally, and color means comprising an applicator wheel having color carrying means extending peripherally of the wheel and transversely thereof, drive means for rotating said wheel in close proximity to the peak surface of said ridge at a surface speed differing slightly from the surface speed of said body, reservoir means for supplying ink to said color carrying means and including side plate means juxtaposed respectively to the sides of said wheel in ink flow inhibiting relation and fixing the axial position of the wheel and ink flow metering means regulating the supply of ink to said color carrying means to that quantity of ink removed therefrom by said peak surface of said ridge, mounting means constructed and arranged for mounting said color means in operative association with said carrying means, said mounting means including pivot means for supporting said applicator wheel and said reservoir means to swing about a horizontal axis perpendicular to the direction of travel of said body on the carrying means, said drive means comprising a pair of drive wheels coaxial and corotatable with said applicator wheel and engageable in driving relation with said body moving longitudinally along said carrying means.

* * * * *